(12) United States Patent
Reddehase et al.

(10) Patent No.: US 11,345,202 B2
(45) Date of Patent: May 31, 2022

(54) CENTRAL JOINT FOR A THREE-POINT SUSPENSION LINK

(71) Applicant: ZF Friedrichshafen AG, Friedrichshafen (DE)

(72) Inventors: Günter Reddehase, Brockum (DE); Jörg Heemann, Diepholz (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 351 days.

(21) Appl. No.: 16/641,020

(22) PCT Filed: Jul. 25, 2018

(86) PCT No.: PCT/EP2018/070082
§ 371 (c)(1),
(2) Date: Feb. 21, 2020

(87) PCT Pub. No.: WO2019/042661
PCT Pub. Date: Mar. 7, 2019

(65) Prior Publication Data
US 2020/0307333 A1    Oct. 1, 2020

(30) Foreign Application Priority Data
Aug. 28, 2017   (DE) .................... 10 2017 214 963.9

(51) Int. Cl.
*B60G 7/00* (2006.01)
*B60G 7/02* (2006.01)
*F16C 11/06* (2006.01)

(52) U.S. Cl.
CPC ............. *B60G 7/005* (2013.01); *B60G 7/008* (2013.01); *B60G 7/02* (2013.01); *F16C 11/0642* (2013.01);
(Continued)

(58) Field of Classification Search
CPC .......... B60G 7/005; B60G 7/008; B60G 7/02; B60G 2200/315; B60G 2204/143;
(Continued)

(56) References Cited

U.S. PATENT DOCUMENTS 1,809,703 A * 6/1931 Hufferd ............... F16C 11/0628
403/140
4,712,940 A * 12/1987 Wood, Jr. ............ F16C 11/0628
403/133
(Continued)

FOREIGN PATENT DOCUMENTS

DE    11 2006 000 910    3/2008
DE    10 2012 223609    6/2014
(Continued)

*Primary Examiner* — Darlene P Condra
(74) *Attorney, Agent, or Firm* — Cozen O'Connor

(57) ABSTRACT

A three-point suspension link has a housing supported by a ball joint so as to be rotatably and swivelably movable relative to an axle connection of the link. The link further has a captive securing arrangement functioning as a stop and extending perpendicular to the central axis of the axle connection so as to prevent a separation of the housing and axle connection in the event of failure of the ball joint. The captive securing arrangement extends perpendicular to the central axis of the axle connection operatively in two spatial directions. The three-point suspension link is formed as an axle guide link for guiding a rigid axle.

14 Claims, 6 Drawing Sheets

(52) U.S. Cl.
CPC .. *B60G 2200/315* (2013.01); *B60G 2204/143* (2013.01); *B60G 2204/148* (2013.01); *B60G 2204/416* (2013.01); *B60G 2204/45* (2013.01)

(58) Field of Classification Search
CPC ........ B60G 2204/148; B60G 2204/416; B60G 2204/45; B60G 2206/124; B60G 7/00; F16C 11/0642; F16C 11/0609; F16C 2326/05
See application file for complete search history.

(56) References Cited

U.S. PATENT DOCUMENTS

| | | | | |
|---|---|---|---|---|
| 4,986,689 | A * | 1/1991 | Drutchas | F16C 11/106 403/135 |
| 8,851,785 | B1 * | 10/2014 | Belleau | F16C 11/0671 403/135 |
| 10,527,089 | B2 * | 1/2020 | Winter | F16C 11/0623 |
| 2011/0153157 | A1 * | 6/2011 | Klank | B60G 7/005 701/37 |
| 2019/0232746 | A1 * | 8/2019 | Yu | F16C 11/00 |

FOREIGN PATENT DOCUMENTS

| | | |
|---|---|---|
| EP | 0884489 | 12/1998 |
| WO | WO 2015069237 | 5/2015 |

* cited by examiner

CENTRAL JOINT FOR A THREE-POINT SUSPENSION LINK

CROSS REFERENCE TO RELATED APPLICATIONS

This is a U.S. national stage of application No. PCT/EP2018/070082, filed on Jul. 25, 2018. Priority is claimed on German Application No. 10 2017 214 963.9, filed Aug. 28, 2017, the content of which is incorporated herein by reference.

FIELD OF THE INVENTION

The invention is directed to a central joint for a three-point suspension link and a three-point suspension link having a central joint of this type.

BACKGROUND OF THE INVENTION

Axle suspensions of commercial vehicles, for example, for commercial goods transport or commercial passenger transport, often have rear axles which are formed as rigid axles. Rigid axles of this kind can be guided by a three-point suspension link which is arranged above the rigid axle in an upper link plane. A three-point suspension link of this kind has two link arms which form an angle with one another and converge at a first end of the three-point suspension link in a first bearing point. The three-point suspension link is connected in this first bearing point to a rigid axle body of the rigid axle via a central joint, this central joint being associated with the three-point suspension link and formed as a ball joint. The two other ends of the three-point suspension link are connected to a vehicle frame in each instance via a guide joint, for example, a molecular joint. The central joint allows rolling movements, i.e., rotating movements around the longitudinal axis of the vehicle and compression movements and rebound movements of the rigid axle. Further, driving torque and braking torque is introduced into the three-point suspension link via the central joint when the rigid axle is formed as a drive axle.

Due to increased wear or overloading of the central joint, connections between individual parts of the central joint may come apart. In particular, an inner race and/or an outer race of a ball joint arranged inside of the central joint may become worn to the extent that these parts, which normally interlock by positive engagement, separate from one another. As a result of this damage event, the connection between the three-point suspension link and the rigid axle body which is realized via the central joint could come apart. This is also referred to as a separation of the central joint, which carries the risk of serious material damage and possibly even personal injury. Therefore, captive securing arrangements for preventing a complete separation of the central joint are known from the prior art.

For example, a captive securing arrangement formed as a crossbar, also known as a stop element, for a central joint is known from DE 11 2006 000 910 T5. The central joint has a ball joint and is connected to a rigid axle. The crossbar is oriented exclusively in transverse direction of the vehicle, i.e., only in one individual spatial direction. In this way, free passage is provided to prevent the crossbar from colliding with adjacent component parts when the height of the central joint is small, particularly during large compression movements and/or rebound movements of the rigid axle. However, this is achieved at the expense of ensuring against a separation of the central joint when the crossbar comes into operation as a stop when the connection between an inner race and an outer race of the ball joint comes apart. In this case, a separation of the central joint is prevented by both ends of the crossbar together only when there is no roll deflection of the central joint. On the other hand, if the central joint is deflected as a result of roll, chassis forces which try to separate the central joint must be accommodated entirely by only one end of the crossbar. If this one end of the crossbar acting against a separation of the central joint is then further loaded in addition to the normal operating loads occurring during driving operation, for example, due to an exceptional occurrence such as driving over a curb, the end acting on its own can be bent or even broken. A crossbar that is cut off in this way no longer offers an efficient protection against separation because it is highly likely that the crossbar will work itself out of the central joint in the course of further driving.

It is an object of the invention to provide a central joint with a captive securing arrangement which offers enhanced insurance against a separation of the central joint in the event of failure of the central joint.

SUMMARY OF THE INVENTION

Accordingly, the invention provides a central joint for a three-point suspension link. The central joint has a housing which is supported by a ball joint so as to be rotatably and swivelably movable relative to an axle connection of the central joint. The central joint further has a captive securing arrangement which functions as a stop and which extends perpendicular to the central axis of the axle connection and prevents a separation of the housing and axle connection in the event of failure of the ball joint. According to the invention, the captive securing arrangement extends perpendicular to the central axis of the axle connection operatively in two spatial directions.

In particular, the housing and the axle connection are connected so as to be slidingly supported via the ball joint, and the housing surrounds the ball joint preferably at least in an undeflected neutral position of the central joint. The ball joint has an inner part and an outer part which abuttingly surrounds the inner part. The inner part may be formed solid or toroidal and has a convex lateral surface formed as a spherical zone. The spherical zone preferably extends at least substantially symmetric to an equator of the inner part. The outer part which functions as a bearing shell is secured in particular in the housing. It is formed toroidal and has a concave inner circumferential surface which is formed so as to complement the convex spherical zone of the inner part with respect to shape. The concave inner circumferential surface extends analogous to the inner part of the ball joint preferably at least substantially symmetric to an equator of the outer part. In this way and as a result of the outer part abuttingly surrounding the inner part, the inner part and the outer part are connected to one another by positive engagement particularly in the installed state. The outer part and the inner part of the ball joint, respectively, can be formed of one or more parts. The inner part of the ball joint is preferably formed as a separate component part; however, it can also be an integral component part of the axle connection, i.e., formed in one piece with the axle connection. Like the axle connection and the captive securing arrangement, the inner part and the outer part comprise an iron material, particularly steel. Alternatively, the outer part can also be formed from a plastic material. The axle connection is suitable for connecting the central joint to a rigid axle body of a rigid axle, and the axle connection is rigidly connected to the rigid axle body when installed in the vehicle.

A failure of the ball joint exists in particular when the convex lateral surface of the inner part and/or concave inner circumferential surface of the outer part have such extensive wear, for example, through increased dry friction due to insufficient lubrication, that the above-described positive engagement connection between the inner part and the outer part of the ball joint is destroyed and the outer part can accordingly separate from the inner part. Such a separation of inner part and outer part can also be the result of a misuse load acting on a central joint that already has extensive wear brought about, for example, by forcefully driving over the edge of a curb. In these cases, the captive securing arrangement provides a stop which reliably prevents a separation of housing and axle connection. To this end, the captive securing arrangement is supported in particular directly or indirectly at the housing or at portions of the ball joint. The central axis of the axle connection preferably extends in vertical direction of the vehicle when installed in the vehicle. Alternatively, the central axis of the axle connection can also extend at an acute angle of, e.g., 10 degrees relative to the vertical direction of the vehicle. The central axis of the axle connection preferably coincides with the central axis of the central joint. In particular, the ball joint in the undeflected neutral position of the central joint is arranged rotationally symmetric to the central axis of the axle connection and rotationally symmetric to the central axis of the central joint.

As it relates to the present invention, "operatively extending in two spatial directions" means that areas of the captive securing arrangement which would be directly or indirectly struck immediately by portions of the housing and/or ball joint in case of a failure of the ball joint extend perpendicular to the central axis of the axle connection in two spatial directions. In contrast, the areas of the crossbar known from the prior art and described in the introduction which could act as a stop in the event of a failure of the ball joint only extend in one spatial direction, namely, in transverse vehicle direction. By the statement that the captive securing arrangement extends perpendicular to the central axis of the axle connection "operatively" in two spatial directions is meant that the captive securing arrangement not only extends perpendicular to the central axis of the axle connection in two spatial directions in terms of volume but can also actually act as captive securing means, particularly as a stop, in these two spatial directions. As it relates to the present invention, by "extending in two spatial directions" is expressly not meant that the entire captive securing arrangement may extend perpendicular to the central axis of the axle connection exclusively in the two spatial directions described in the foregoing. The two spatial directions according to the present invention are preferably oriented at right angles to one another. Referring to the installed state of the central joint, the two spatial directions are preferably the longitudinal direction of the vehicle and the transverse direction of the vehicle. If especially high forces act on the captive securing arrangement in one of the two spatial directions, for example, forces which could lead to damage to the captive securing arrangement as the result of an exceptional event or a case of misuse, the portion of the captive securing arrangement oriented in the other spatial direction represents an additional safety buffer for effectively preventing the captive securing arrangement from passing through the housing.

In an advantageous manner, the captive securing arrangement is formed symmetric with respect to a plane extending through the central axis of the axle connection. For example, the captive securing arrangement can be formed symmetric with respect to a plane which runs through the central axis of the axle connection and extends in longitudinal direction of the vehicle. In this example, the captive securing arrangement would extend at least in the driving direction or opposite the driving direction proceeding from the central axis of the axle connection. In the event of a failure of the ball joint with particularly high roll forces acting on the captive securing arrangement concurrently, the portion of the captive securing arrangement extending at least in the driving direction or opposite the driving direction would represent the above-mentioned safety buffer against a separation of the central joint.

The captive securing arrangement is preferably formed symmetric with respect to a plurality of planes which extend through the central axis of the axle connection. These plurality of planes extend particularly in longitudinal direction of the vehicle and in transverse direction of the vehicle. Consequently, the captive securing arrangement can be formed in a cross-shaped manner and can accordingly provide an effective protection against the separation of the central joint for all conceivable loads regardless of whether roll forces and/or forces brought about by compression movements or rebound movements and/or braking torques and/or driving torques act on the captive securing arrangement. If the captive securing arrangement is formed in a cross-shaped manner, the arms of this cross can all be identically long or identically long on opposite sides or can have different lengths. The latter construction may be useful, for example, when cross sections of the housing and/or of the ball joint which must be passed by the captive securing arrangement before a separation of the central joint diverge from a circular shape.

It is also conceivable to form the captive securing arrangement symmetric with respect to more than two planes as was described above, for example, in a star-shaped manner. Constructions of this kind present a particularly effective protection against a separation of the central joint when superposed loads brought about, for example, by roll forces and superposed braking forces act on the captive securing arrangement and the line of action of the force resulting from the superposed loads extends neither exactly in longitudinal direction of the vehicle nor exactly in transverse direction of the vehicle.

The captive securing arrangement is advisably formed in a planar manner. A planar captive securing arrangement perpendicular to the central axis of the axle connection has the advantage that when forces brought about, for example, by a particularly strong roll movement of a vehicle body toward the right-hand side of the vehicle act on the captive securing arrangement partially in a determined force introduction point, the surface area portions adjacent to the force introduction point act in a supporting manner and accordingly help to prevent damage to the captive securing arrangement in the force introduction point. Planar captive securing arrangements may be constructed, for example, as a hexagon or an octagon and, in addition to the supporting effect mentioned above, have the added advantage that they are likewise well suited to accommodate the resulting forces as described above.

The captive securing arrangement is advantageously formed to be rotationally symmetric. This facilitates the assembly of the captive securing arrangement because no orientation is required. Moreover, a rotationally symmetric captive securing arrangement can be produced relatively advantageously, for example, by automatic turning. The rotationally symmetric captive securing arrangement is formed in particular to be plate-shaped or disk-shaped and can be advantageously produced because of the rotational symmetry, for example, by automatic turning. However, noncutting production processes such as cold extrusion or forging are also contemplated.

Surfaces of the captive securing arrangement functioning as stop surfaces when there is a risk of separation of the central joint due to failure of the ball joint are preferably arranged at least substantially in a plane extending perpendicular to the central axis of the axle connection. In this way, the installed height of the central joint can be minimized. In particular, the stop surfaces are themselves formed straight considered in a section or in any sections through the central axis of the axle connection so that the production expenditure is minimized. The stop surfaces can also be formed circumferentially and can accordingly be joined to form a continuous stop surface. This continuous stop surface can be formed as a circular ring surface or as a lateral surface of a frustum which is only slightly inclined relative to the above-described plane extending perpendicular to the central axis of the axle connection and accordingly lies substantially in the above-mentioned plane. Alternatively, surfaces of the captive securing arrangement which function as stop surfaces when there is a risk of separation of the central joint due to failure of the ball joint can be at least partially arranged outside of a plane which extends perpendicular to the central axis of the axle connection. These stop surfaces viewed in a section or in any section through the central axis of the axle connection can be formed planar or curved in themselves. Stop surfaces which are curved in themselves may be formed in such a way that they roll, so to speak, on surfaces of the housing and/or of the ball joint after impacting and subsequent roll or compression or rebound of the rigid axle.

The captive securing arrangement is advisably detachably connected to the axle connection. In this way, the captive securing arrangement can be exchanged with minimal effort, for example, when it has been put to use because of a failure of the ball joint and has been damaged.

In an advantageous further development of the invention, the captive securing arrangement is connected to the axle connection by an individual connection element. This connection element is arranged in particular in the center of the captive securing arrangement to have uniform loading when the captive securing arrangement is put to use. As it relates to the present invention, a connection element means particularly an element that is provided for producing a connection between the captive securing arrangement and the axle connection by a frictional engagement connection and/or positive engagement connection. The connection is formed particularly only through the connection element or through the connection element and an additional securing element as a captive connection. The captive securing arrangement is advantageously secured by positive engagement relative to the axle connection perpendicular to the central axis of the axle connection, for example, by a centering shoulder of the axle connection which is embraced in a positive-fit manner by the captive securing arrangement. The use of a rotationally symmetric captive securing arrangement with centrically arranged connection element is particularly advantageous because no orientation of the captive securing arrangement around the central axis of the axle connection is required in such a construction. But even if the captive securing arrangement is not formed rotationally symmetric, the captive securing arrangement can be connected to the axle connection by an individual connection element. In this case, the orientation of the captive securing arrangement relative to the axle connection can be carried out, for example, via complementarily-shaped centering surfaces of the axle connection and of the captive securing arrangement. In particular, the connection element has a threaded portion which extends in direction of the central axis of the axle connection and by which the captive securing arrangement is pulled to the axle connection and clamped against the latter. The connection element can be formed, for example, as a hexagon screw or as a hexagon socket screw.

The one connection element is advisably formed in one piece with the captive securing arrangement or with the axle connection. In this way, the quantity of component parts to be assembled and, therefore, the expenditure on assembly can be reduced.

Alternatively, the captive securing arrangement and the axle connection are connected to one another by a radial press connection. A rigid connection of the captive securing arrangement to the axle connection, and vice versa, is made possible in this way. In particular, the radial press connection is formed as a spline connection, and the serrations are preferably inserted into a bore hole of the captive securing arrangement. Alternatively, the radial press connection can also be constructed as a shrink-fit connection. The radial press connection is advantageously secured against the captive securing arrangement being pulled out in direction of the central axis of the axle connection by a securing element, particularly, an axial securing element, for example, a retaining ring.

According to a further alternative, the captive securing arrangement is undetachably connected to the axle connection. The captive securing arrangement can be connected to the axle connection by bonding, for example, by a weld connection or a glue connection. However, the captive securing arrangement is preferably formed in one piece with the axle connection and, in this case, the axle connection is formed particularly of multiple parts to allow assembly. Forming the captive securing arrangement in one piece with the axle connection provides a particularly stable connection to reliably prevent separation of the axle connection and housing after a failure of the central joint.

The housing advantageously has a housing opening towards the axle connection which is formed to be noncircular, particularly ellipse-shaped. In particular, the housing opening is adapted to the free space required for the maximum deflections of the housing relative to the axle connection. The noncircular, particularly ellipsoidal, shape results because the maximum possible deflections of the housing are generally direction-dependent. The maximum possible deflections are greater particularly in the longitudinal direction of the vehicle than in the transverse direction of the vehicle referring to the installed position in the vehicle. This is because the maximum possible roll angles are usually smaller than the deflections caused by compression and rebound of the rigid axle. Therefore, the housing opening has larger dimensions particularly in the longitudinal direction of the vehicle than in the transverse direction of the vehicle. The longitudinal sides of the ellipse-shaped housing opening oriented in longitudinal direction of the vehicle are at distance from one another that is less than the extension of the rotationally symmetrically formed captive securing arrangement perpendicular to the central line of the axle connection. A housing opening formed in this way offers additional insurance against separation in the event of a failure of the central joint because it is not possible for the rotationally symmetrically formed captive securing arrangement to pass through.

The housing preferably has at least one internal clearance into which outer areas of the captive securing arrangement can project during large deflections of the central joint. In this way the overall height of the central joint can be minimized also when using a captive securing arrangement which extends perpendicular to the central axis of the axle connection in two spatial directions and, for example, is formed rotationally symmetric. The at least one clearance is recessed into an inner torus of the housing extending at least substantially perpendicular to the central axis of the axle connection referring to the undeflected neutral position of the central joint, particularly on the side opposite the axle connection. In particular, the at least one clearance is formed in such a way that there cannot be any contact, and certainly no collision, between the captive securing arrangement and the housing under any possible deflection of the central joint. Internally, the housing can have a plurality of individual trough-shaped clearances whose position is adapted to direction-dependent maximum deflections of the central joint. This plurality of individual clearances is arranged particularly in pairs diametrically opposite one another. Alternatively, the individual trough-shaped clearances can also be formed as a contiguous three-dimensional clearance which is formed to complement in shape an imaginary envelope curve enveloping all of the movement space required for all possible movement states of the captive securing arrangement. However, the housing preferably has an individual trench-like and, at the same time, annular circumferentially extending clearance.

A flange plate of the axle connection advantageously has at least one clearance into which outer areas of the housing can project during large deflections of the central joint. This configuration also contributes to minimizing the overall height of the central joint. Analogous to the internal clearance of the housing, the flange plate can also have a plurality of individual trough-shaped clearances or only one trench-like and, at the same time, annular circumferentially extending clearance. The other possible configurations for the at least one clearance in the flange plate are also analogous to the at least one internal clearance of the housing.

In an advantageous further development of the invention, a dome or a journal of the axle connection has at least one clearance into which outer areas of the housing and/or outer areas of a bearing shell of the ball joint can project particularly during large deflections of the central joint. As a result of these steps, especially large deflections of the housing relative to the axle connection can be realized which, depending on direction, can amount to, for example, ±25 degrees proceeding from the undeflected neutral position of the central joint. As meant in the present invention, a dome is described when the axle connection is formed of one part and comprises the flange plate and the dome formed in one piece with the latter. A journal is described when the axle connection is formed of two parts and is formed from the flange plate and the journal which is rigidly connected to the latter. In particular, the central axes of the dome and of the journal coincide with the central axis of the axle connection.

Analogous to the clearances of the housing and flange plate which have already been described, the dome or the journal can likewise have a plurality of individual trough-shaped clearances or only one individual clearance which is formed as a trench-like necked-down portion which simultaneously annularly surrounds the dome or journal. An annular circumferentially extending clearance of this kind is formed to be rotationally symmetric in particular and, for example, is configured similar to an inner lateral surface of a torus, preferably with rounded transitions to the dome or journal. If a plurality of individual clearances is provided, they are likewise arranged particularly in pairs diametrically opposite one another and form, for example, a waist of the dome or of the journal. The other possible configurations of the at least one clearance of the dome or journal are likewise analogous to those of the at least one internal clearance of the housing. However, the at least one clearance of the dome or journal is shaped out only to the extent that the remaining residual cross section of the dome or journal can still reliably accommodate the maximum forces occurring in the central joint. Due to a combination of the above-described clearances of the housing and/or of the flange plate and/or of the dome or journal, a particularly low overall height of the central joint can be achieved also when using the captive securing arrangement extending perpendicular to the central axis of the axle connection in two spatial directions. This also applies particularly when the captive securing arrangement is formed in a planar manner, particularly so as to be rotationally symmetric.

The invention is further directed to a three-point suspension link with a central joint as described above, which three-point suspension link is formed as an axle guide link for guiding a rigid axle, particularly a rigid axle of a commercial vehicle. In particular, the three-point suspension link has two link arms which form an angle with one another and which converge at one end of the three-point suspension link in a first bearing point. In the first bearing point, the three-point suspension link is connectable to a rigid axle body of the rigid axle via the central joint. The two other ends of the three-point suspension link are connectable to a vehicle frame via a guide joint, for example, a molecular joint.

BRIEF DESCRIPTION OF THE DRAWINGS

The invention will be described in more detail in the following referring to drawings showing merely exemplary embodiments. Like reference numerals denote like, similar or functionally like component parts or elements. The drawings show.

DETAILED DESCRIPTION OF THE PRESENTLY PREFERRED EMBODIMENTS

Figure 1:
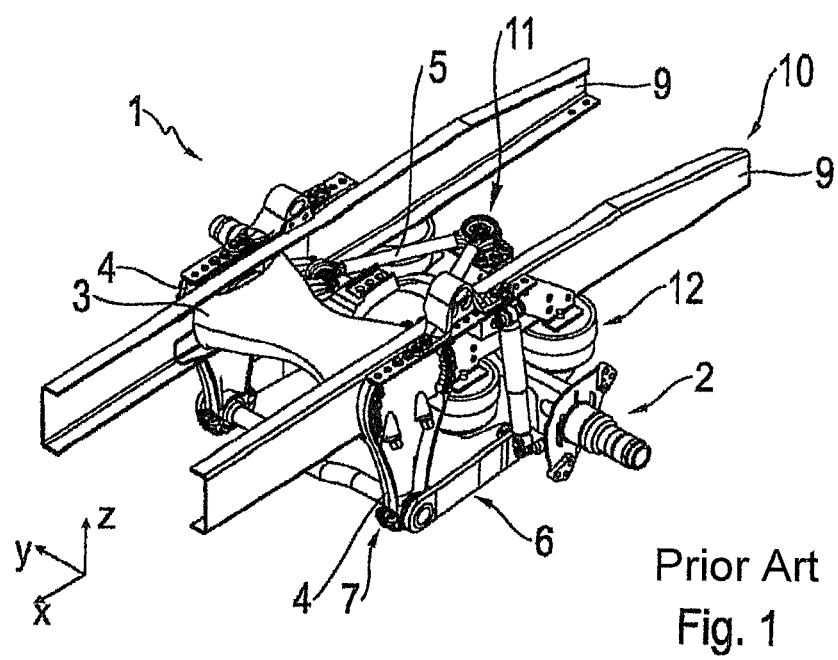
FIG. 1 is a perspective view of a chassis arrangement according to the prior art.

FIG. 1 shows a chassis arrangement 1 with a drawn drive axle which is formed as a rigid axle and has a rigid axle body 2. Referring to a positive longitudinal vehicle direction x which corresponds to the forward driving direction, the rigid axle is arranged behind a transverse support member 3 extending in a transverse vehicle direction y and a support 4 extending substantially in a vertical vehicle direction z is arranged on each vehicle side. In an upper link plane referring to the positive vertical vehicle direction z, the rigid axle is drawn by a V-shaped axle guide link which extends substantially in longitudinal vehicle direction x and is formed as a three-point suspension link 5. The three-point suspension link 5 is formed symmetric with respect to a plane which is defined by the longitudinal vehicle direction x and the vertical vehicle direction z and has two molecular joints via which it is connected to the transverse support member 3. Further, the three-point suspension link 5 has a central joint 11 for connecting the three-point suspension link 5 to the rigid axle body 2 so as to be rotatably and swivelably movable. The rotating and swiveling movements are made possible by a ball joint arranged inside of the central joint 11. The central joint 11 moves up and down substantially in vertical vehicle direction z during driving operation due to compression movements and rebound movements of the rigid axle body 2.

In a lower link plane, the rigid axle is drawn by two longitudinal links 6 which are arranged parallel to one another in transverse vehicle direction y on the outer side of the vehicle and extend in longitudinal vehicle direction x. The longitudinal links 6 are connected, respectively, to the rigid axle body 2 at one end and, respectively, to a lower force introduction area 7 of one of the two supports 4 at the other end. The end areas of the longitudinal links 6 are swivelable relative to the lower force introduction area 7 and the rigid axle body 2 around a swiveling axis extending in transverse vehicle direction y. The chassis arrangement 1 has in each instance a longitudinal support member 9 on each side of the vehicle at which the rigid axle body 2 is supported via pneumatic springs 12. The two longitudinal support members 9 extend parallel to one another in longitudinal vehicle direction x and, together with the transverse support member 3, form a component part of a vehicle frame 10. The terms longitudinal vehicle direction x, transverse vehicle direction y and vertical vehicle direction z are used analogous to FIG. 1 in the following.

Figure 2:
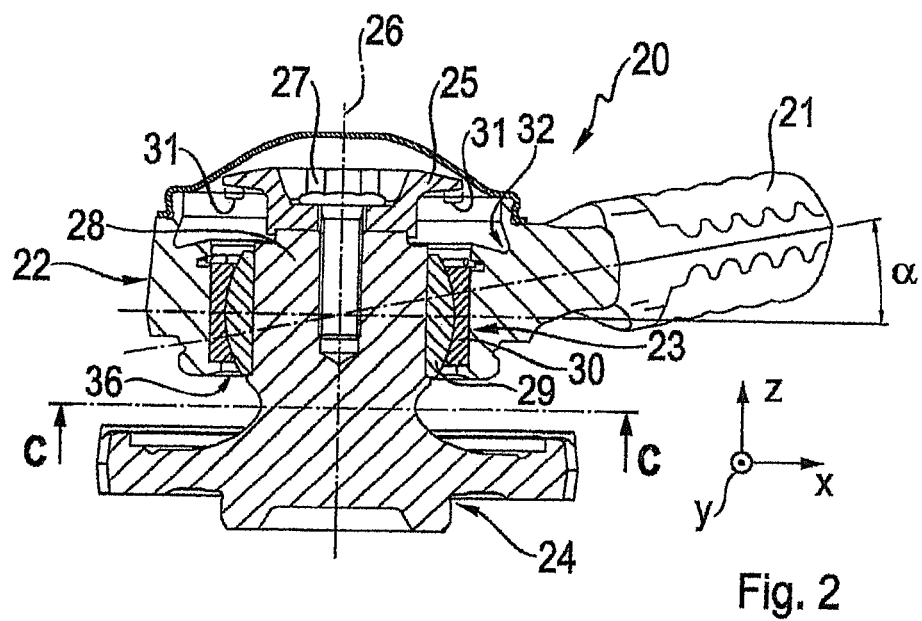
FIG. 2 is a sectional view according to the section line A-A indicated in FIG. 6 of a central joint according to a first embodiment form of the invention.

FIG. 2 shows a central joint 20 for a three-point suspension link 470 in an undeflected neutral position which is, at the same time, the installed position in an unladen commercial vehicle. In this neutral position, the central joint 20 has an offset-like pre-angling α, meaning that a shaft 21 of the central joint 20 forms an acute angle relative to the horizontal amounting to 10 degrees in this embodiment example. The horizontal lies in a plane which is defined by the longitudinal vehicle direction x and the transverse vehicle direction y and extends primarily parallel to a standing surface of the commercial vehicle. The central joint 20 has a housing 22 which is formed in one piece with the shaft 21 but has no pre-angling and, rather, is oriented horizontally. Housing 22 is supported by a ball joint 23 so as to be rotatably and swivelably movable relative to an axle connection 24 of the central joint 20. The ball joint 20 has a captive securing arrangement 25 functioning as stop which extends perpendicular to a central axis 26 of the axle connection 24 and prevents a separation of the housing 22 and axle connection 24 in the event of failure of the ball joint 23. The captive securing arrangement 25 extends perpendicular to the central axis 26 of the axle connection 24 operatively in two spatial directions, namely, in the longitudinal vehicle direction x and in the transverse vehicle direction y. Further, the captive securing arrangement 25 is formed in a plate-shaped manner and extends rotationally-symmetrically around the central axis 26 of the axle connection 24. The central axis 26 of the axle connection 24 is at the same time the central axis of the central joint 20. The central joint 20 is shown in section. The section plane is defined through the longitudinal vehicle direction x and the vertical vehicle directions z and extends through central axis 26 of axle connection 24 at the same time. The central joint 20 is formed in a mirror-symmetric manner with reference to this section plane.

The captive securing arrangement 25 is rigidly and, at the same time, detachably connected to a dome 28 of the axle connection 24 by an individual connection element which is formed as a hexagon screw 27. Hexagon screw 27 which presses the captive securing arrangement 25 against a front side of the dome 28 is screwed into a centrically arranged inner thread of the dome 28. The dome 28 has a cylindrical centering shoulder which is received by a complementarily-shaped pocket-like recess of the captive securing arrangement 25. Therefore, no orientation in circumferential direction of the captive securing arrangement 25 is required when assembling the captive securing arrangement 25. The ball joint 23 has an inner part formed as an inner race 29 and an outer part which abuttingly surrounds the inner race 29 and which is formed as an outer race 30. The inner race 29 is formed solid and has a convex lateral surface which is formed as a spherical zone extending symmetric to an equator of the inner race 29. The outer race 30 which functions as a bearing shell is axially secured in the housing 22, specifically, by a retaining ring at one end and by a collar-like shoulder of the housing 22 at the other end. The outer race 30 is formed annular and has a concave inner circumferential surface which is formed to complement the convex spherical zone of the inner race 29 with respect to shape. In the event of a failure of the ball joint 23, the captive securing arrangement 25 provides a stop which prevents a separation of the housing 22 and axle connection 24. In so doing, the captive securing arrangement 25 is supported directly or indirectly at the inner race 29 of the ball joint 23. The indirect support is provided when the captive securing arrangement 25 rests on the retaining ring. In the depicted neutral position of the central joint 20, a circumferential annular surface of the captive securing arrangement 25 which functions as a stop surface 31 when there is a risk of separation of the central joint 20 is arranged in a plane extending perpendicular to the central axis 26 of the axle connection 24.

Figure 3:
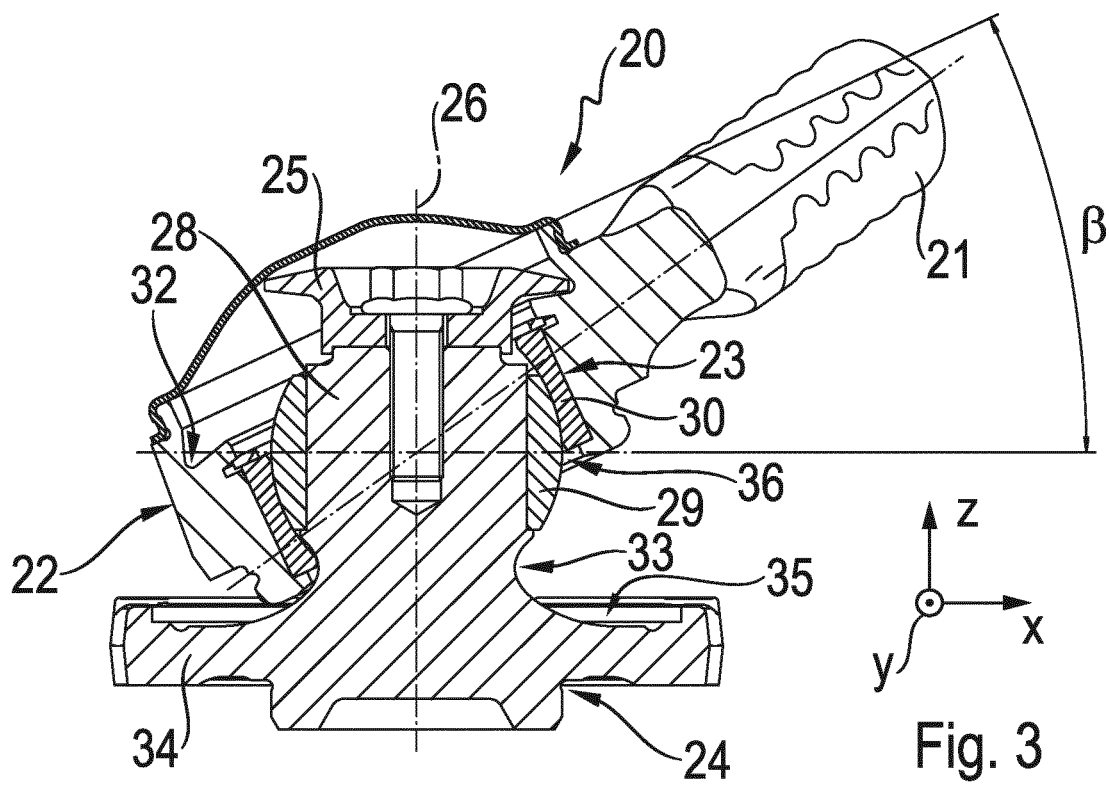
FIG. 3 is a sectional view of the central joint according to FIG. 2 in a first extremely deflected position.

FIG. 3 shows the central joint 20 in a first extremely deflected position which occurs when a rigid axle of the commercial vehicle is at maximum rebound and the central joint 20 is simultaneously not deflected by a superposed roll movement. The deflection of the housing 22 relative to the horizontal shall be referred to hereinafter as spring deflection β because it originates from the compression and rebound of the rigid axle. The spring deflection β is a swiveling of the housing 22 around a transverse vehicle axis amounting in the present instance to 20 degrees. The deflection of the shaft 21 relative to the horizontal amounts to a total of 30 degrees because of the pre-angling α of the shaft 21 by 10 degrees relative to the horizontal. To enable such a large spring deflection β, the housing 22 has an internal clearance 32 which is recessed into an internal annular surface of the housing 22 on the side opposite the axle connection 24 referring to the undeflected neutral position of the central joint 20. The annular surface extends perpendicular to the central axis 26 of the axle connection 24 in the neutral position of the central joint 20. The clearance 32 is formed in a trench-like manner and extends annularly circumferentially inside of the annular surface so that the outer areas of the plate-shaped captive securing arrangement 25 can project into it. In so doing, there is no contact between the outer areas of the captive securing arrangement 25 and the clearance 32 even at maximum spring deflection β, at least provided the ball joint 23 is intact. Further, the dome 28 of the axle connection 24 has an annular circumferentially extending clearance 33 into which outer areas of housing 22 and of the outer race 30 of the ball joint 23 project under the existing extreme spring deflection β, this outer race 30 functioning as bearing shell.

Figure 4:
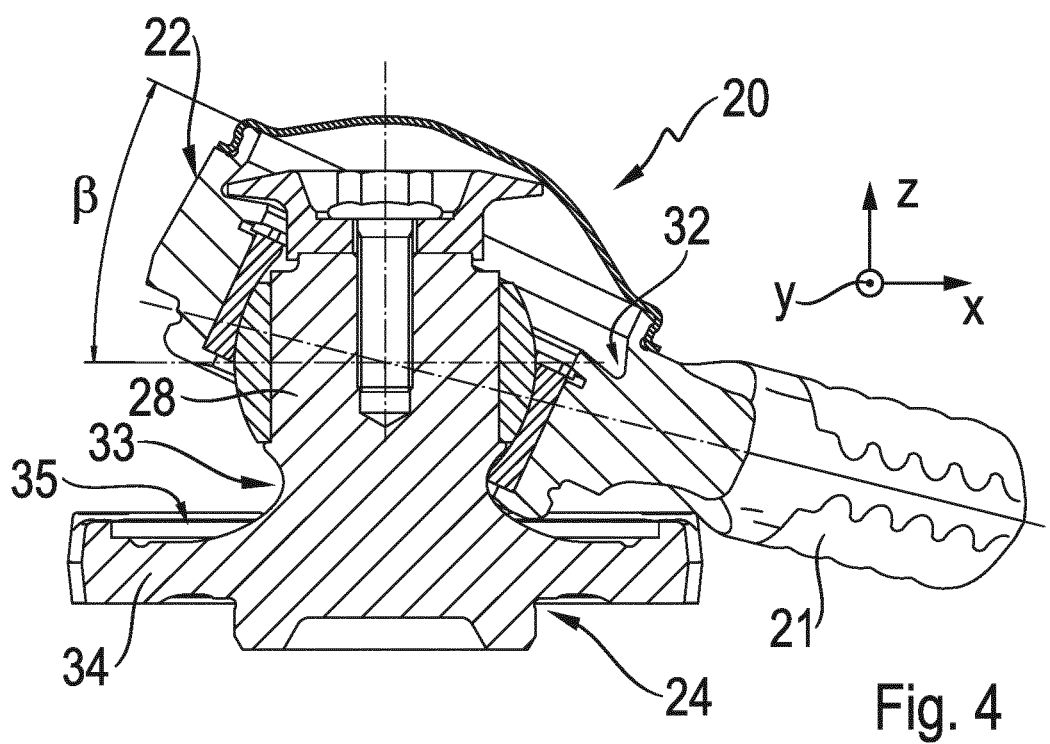
FIG. 4 is a sectional view of the central joint according to FIGS. 2 and 3 in a second extremely deflected position.

FIG. 4 shows the central joint 20 in a second extremely deflected position which exists when the rigid axle is at maximum compression and the central joint 20 is not additionally deflected by a superposed roll movement at the same time. The spring deflection β also amounts to 20 degrees in the present case, and the deflection of the shaft 21 relative to the horizontal only amounts to 10 degrees because of the pre-angling a of shaft 21 relative to the horizontal. The descriptions referring to FIG. 3 and FIG. 4 make clear that the pre-angling α of the shaft 21 serves to achieve maximum possible spring deflections β of the central joint 20 which, in terms of amount, are just as large during compression of the rigid axle as during rebound referring to the undeflected neutral position of the central joint 20. Alternatively, the same effect could also be achieved by an inclined position of the dome 28 in connection with a shaft 21 that is not pre-angled. As can be seen from FIG. 4, the dome 28 is not in an inclined position in the present case but rather extends at right angles to the horizontal and to a flange plate 34 formed integral with the dome 28. The flange plate 34 and the dome 28 together form the axle connection 24. In order to make possible the depicted extreme spring deflection β, the flange plate 34 has a clearance 35 which extends annularly circumferentially around the dome 28 and which is formed as an annular groove and makes it possible for outer areas of housing 22 to project into it. The clearances 32, 33 and 35 contribute to a comparatively small overall height of the central joint 20.

Figure 5:
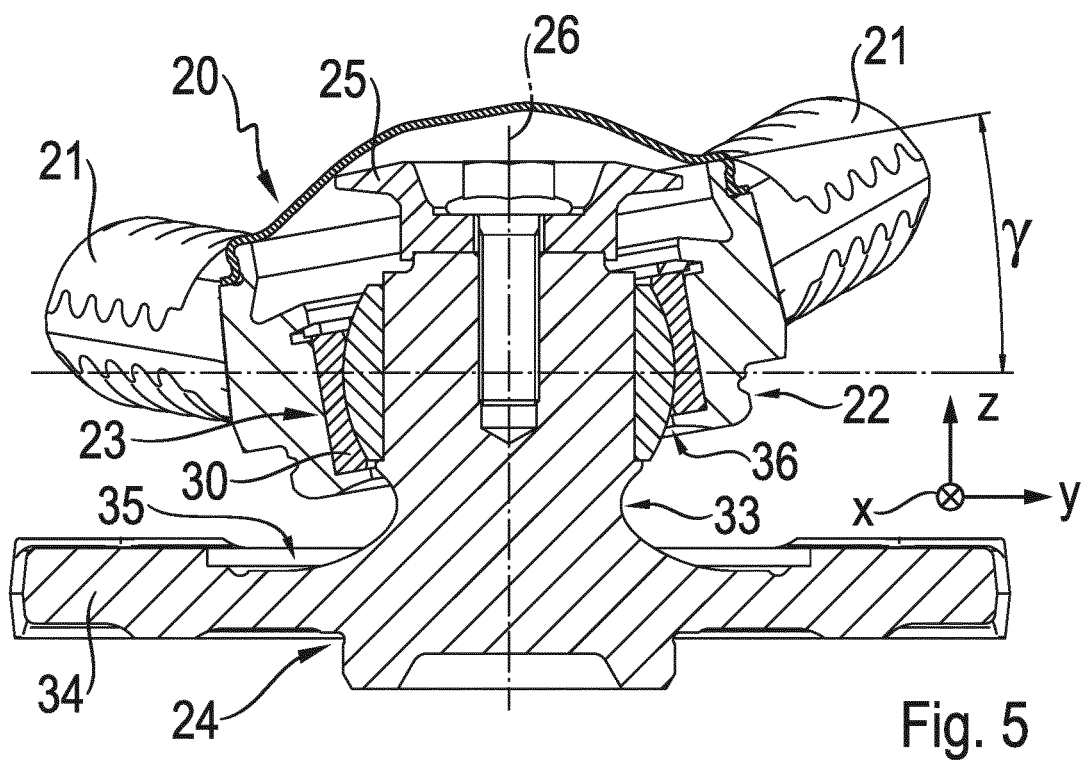
FIG. 5 is a sectional view of the central joint according to FIGS. 2 to 4 in a third extremely deflected position in accordance with the section line B-B indicated in FIG. 6.

FIG. 5 shows the central joint 20 in a third extremely deflected position in which the housing 22 and the shafts 21 which are connected integral with the latter are oriented at an inclination to the flange connection 24 as a result of a roll deflection γ amounting to 10 degrees in the present instance. The roll deflection γ is a swiveling of the housing 22 around a longitudinal vehicle axis extending in longitudinal vehicle direction x. The central joint 20 is shown in its installed position. The roll deflection γ of housing 22 is caused by a swiveling of a vehicle body around the longitudinal vehicle axis. The swiveling may come about, for example, due to a cornering during which the vehicle body, but not the rigid axle and the axle connection 24 rigidly connected thereto, tilts toward the outside of the corner. In FIG. 5, the section plane is rotated 90 degrees around the central axis 26 of the flange connection 24 compared to FIGS. 2 to 4. FIG. 5 shows the central joint 20 considered in driving direction (positive longitudinal vehicle direction x). In this section, despite maximum roll deflection γ, the housing 22 does not project into the annular circumferentially extending clearance 33 which is formed rotationally symmetric for reasons of cost and which is configured for the maximum possible swiveling of the housing 22. This maximum possible swiveling of the housing 22 exists at maximum spring deflection β.

Housing 22 has a housing opening 36 towards the flange connection 24 or flange plate 34, which housing opening 36 is ellipse-shaped and has a smaller extension in transverse vehicle direction y than in longitudinal vehicle direction x (see FIG. 2). This will be apparent when comparing the overlapping of the rotationally symmetrically formed outer race 30 of the ball joint 23 with the housing opening 36 in FIGS. 2 and 5. The elliptic shape of the housing opening 36 comes about in that the housing opening 36 should be kept as small as possible in principle for reasons of stability. At the same time, however, the free passage required for the maximum spring deflections β and roll deflections γ should also be provided in the area of the housing opening 36 in both positive direction and negative direction. The housing opening 36 is formed ellipse-shaped because the maximum spring deflections β with, in the present instance, +/−20 degrees are greater than the maximum roll deflections with, in the present instance, +/−10 degrees. Considering the central joint 20 from above, the outline 38 of the captive securing arrangement 25 is larger than the outline 37 of the housing opening 36. For this reason, the captive securing arrangement 25 cannot pass through the housing opening 36. Accordingly, the housing opening 36 provides additional insurance against a separation of the housing 22 and flange connection 24 which takes effect in case the outer race 30 should become detached as a result of wear, for example, abrasive wear.

Figure 6:
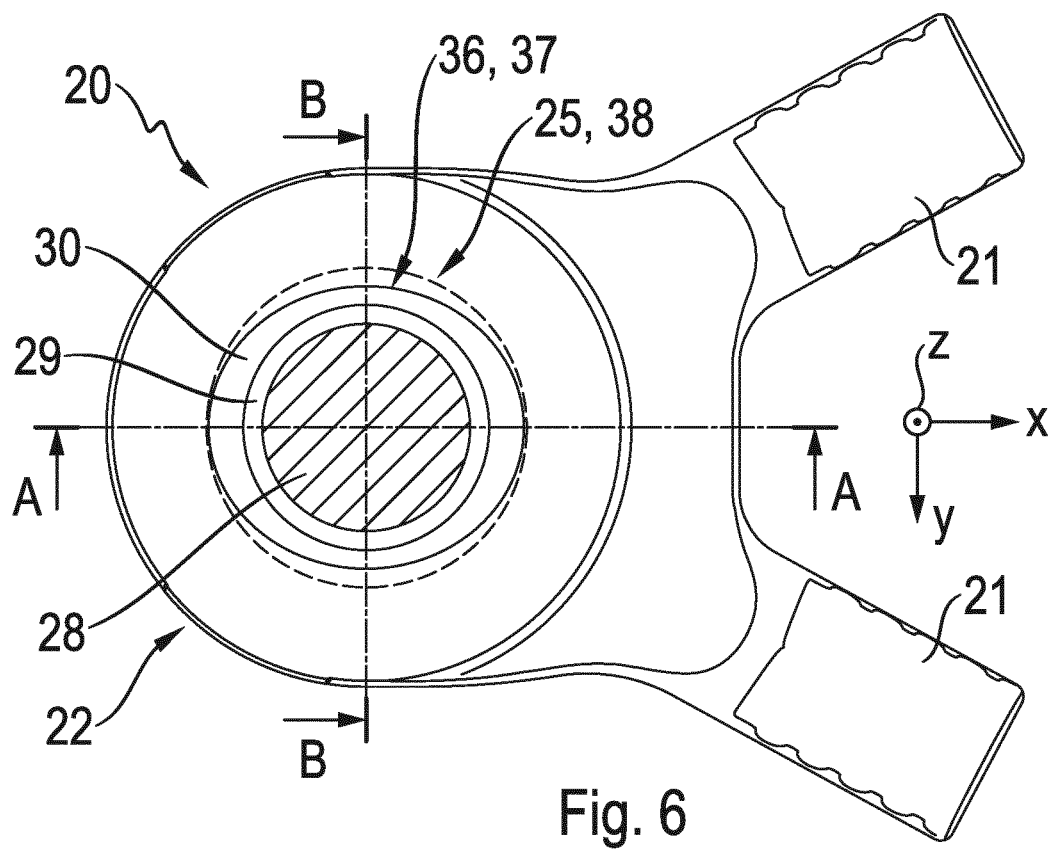
FIG. 6 is a sectional view of the central joint according to FIGS. 2 to 5 and according to the section line C-C indicated in FIG. 2.

It is apparent from FIG. 6 that the circular outline 38 of the captive securing arrangement 25 shown in dashed lines is larger than the ellipse-shaped outline 37 of the housing opening 36 shown as a solid line. For the sake of clarity, some circumferential lines extending concentric to the dome 28 shown in section in the area of the rotationally symmetric clearance 33 are hidden in FIG. 6. A circumferential line which divides the inner race 29 from the outer race 30 of the ball joint 23 is shown. It will be noted that the sectional view according to FIG. 5 refers only to the section line B-B shown in FIG. 6 because the central joint 20 is deflected in FIG. 5 and not in FIG. 6.

Figure 7:
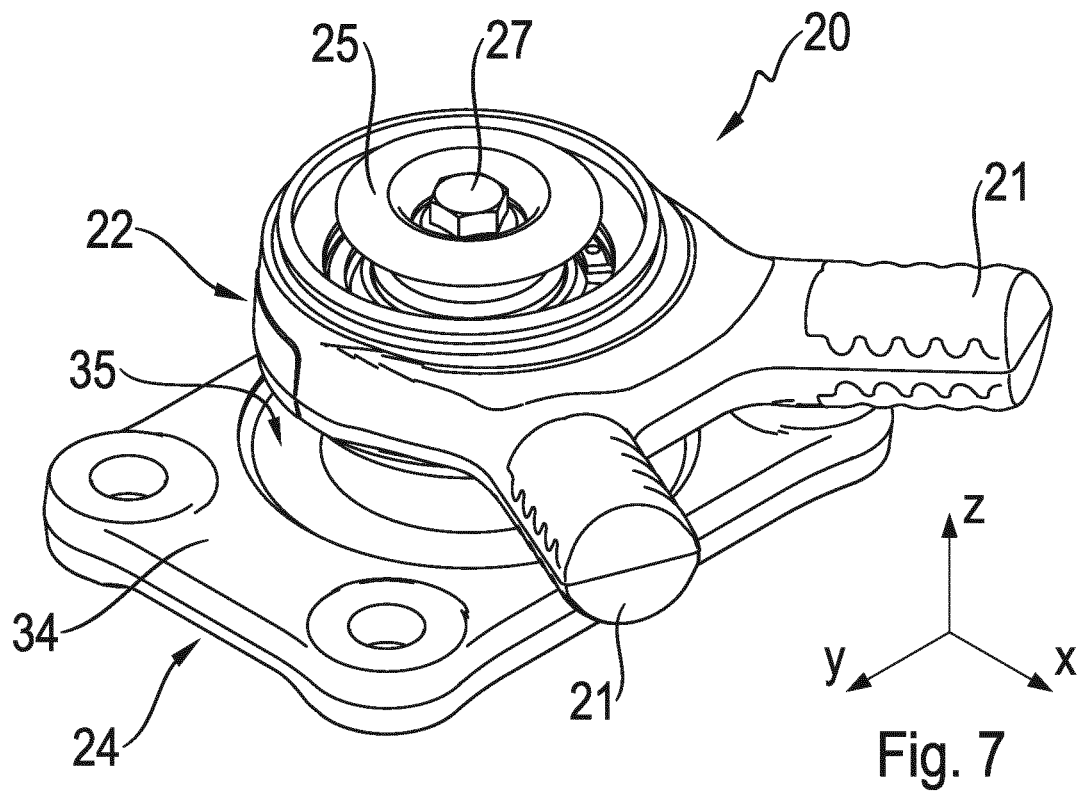
FIG. 7 is a perspective oblique top view of the central joint according to FIGS. 2 to 6.

The captive securing arrangement 25 which is formed rotationally symmetric and in a plate-shaped manner at the same time is clearly discernible in FIG. 7 as is the hexagon screw 27 by which the captive securing arrangement 25 is rigidly connected to the dome 28. The retaining ring by which the outer race 30 of the ball joint 23 is secured in housing 22 is also clearly shown. The retaining ring has a circumferential break so that it can be compressed for insertion into the housing 22. This is carried out by pliers which engage in two holes, only one of which is shown, which are arranged adjacent to the break. The flange plate 34 is formed rectangular and has in each of its four corners a through-bore hole for fastening the flange plate 34 to the rigid axle. The clearance 35 in the flange plate 34 which is formed as an annular trench is also clearly shown. The clearance 35 is arranged concentric to the dome 28.

Figure 8:
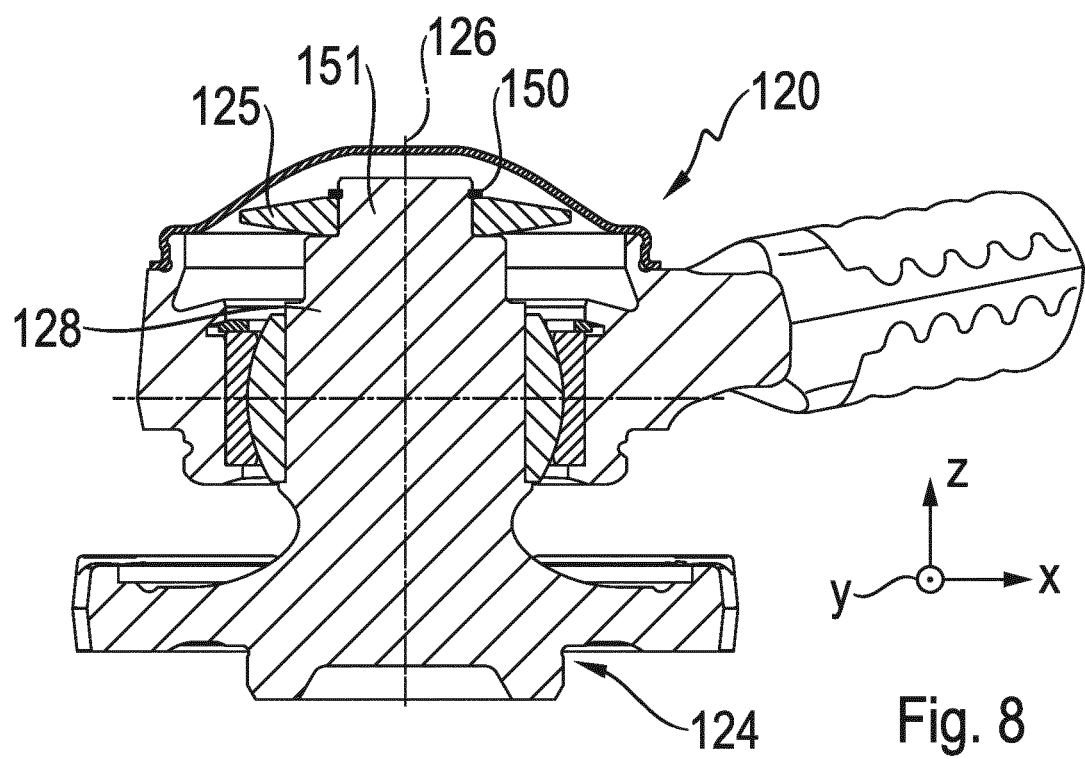
FIG. 8 is a sectional view analogous to FIG. 2 of a central joint according to a second embodiment form of the invention.

FIG. 8 shows a central joint 120 in which a captive securing arrangement 125 is rigidly connected to a dome 128 of an axle connection 24 by a radial press connection. The radial press connection is formed as a spline connection with a serration inserted into a bore hole of the captive securing arrangement 125. The bore hole is arranged centrically in the rotationally symmetric captive securing arrangement 125 and is penetrated by a neck projection 151 of dome 128 in the assembled state. The neck projection 151 acts as a connection element. A securing element which is formed as a retaining ring 150 provides axial safety and prevents the captive securing arrangement 125 from coming off in direction of a central axis 126 of the axle connection 124. The captive securing arrangement 125 acts in a manner analogous to the captive securing arrangement 25 described referring to FIGS. 2 to 7.

Figure 9:
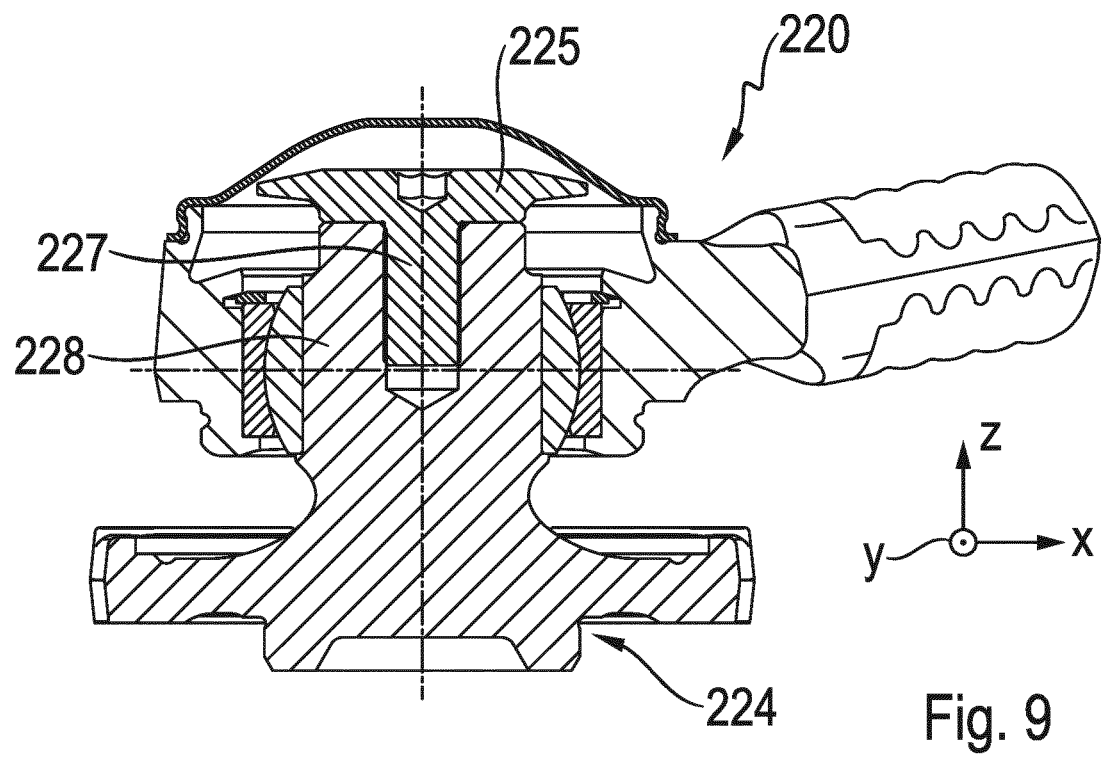
FIG. 9 is a sectional view analogous to FIG. 2 showing a central joint according to a third embodiment form of the invention.

In the embodiment example shown in FIG. 9, a captive securing arrangement 225 of a central joint 220 is rigidly fastened to a dome 228 of an axle connection 224 by an individual connection element 227. The captive securing arrangement 225 is formed integral with the connection element 227. The connection element 227 is formed as a threaded pin which is screwed into a front pocket hole of the dome 228. The captive securing arrangement 225 has a centrically arranged socket hexagon recess on the front side for transmitting the screwing torque. The captive securing arrangement 225 also acts in a manner analogous to the captive securing arrangement 25 described referring to FIGS. 2 to 7.

Figure 10:
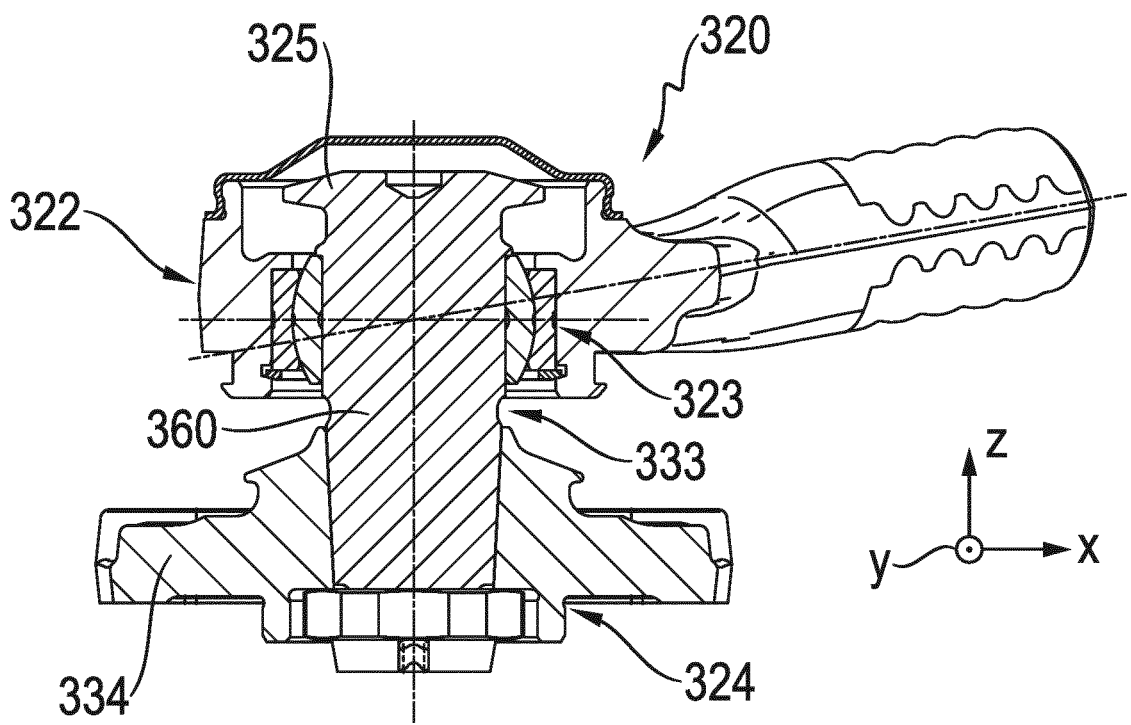
FIG. 10 is a sectional view analogous to FIG. 2 of a central joint according to a fourth embodiment form of the invention.

FIG. 10 shows a central joint 320 with a captive securing arrangement 325 which is undetachably connected to an axle connection 324. The undetachable connection comes about in that the captive securing arrangement 325 is formed integral with a journal 360 of the axle connection 324. The axle connection 324 itself is formed of two parts in this embodiment for reasons pertaining to assembly and comprises a flange plate 334 to which the journal 360 is rigidly connected via a conical seat. The conical seat is preloaded in axial direction of journal 360 by a nut. For this reason, the journal 360 acts in the same manner as the previously described dome 28, 128 and 228 in the assembled state. The flange plate 334 has no clearance analogous to the clearance 35 described above. In the event of a failure of a ball joint 323 and consequent risk of separation of the central joint 320, the captive securing arrangement 325 is supported on an inner circumferential surface of a housing 322 of central joint 320. Otherwise, the captive securing arrangement 325 acts in a manner substantially analogous to that of the captive securing arrangement 25 described referring to FIGS. 2 to 7. In this embodiment example also, housing 322 has a housing opening towards the flange plate 334; however, the housing opening is circular in this instance. If the housing opening had a non-round outline, for example, an ellipse-shaped outline as described previously, it would be impossible to mount the ball joint 323. The journal 360 has a clearance 333 which extends annularly circumferentially around the journal 360 and which is formed rotationally symmetric and into which outer areas of housing 322 can project during large deflections of the central joint 320.

Figure 11:
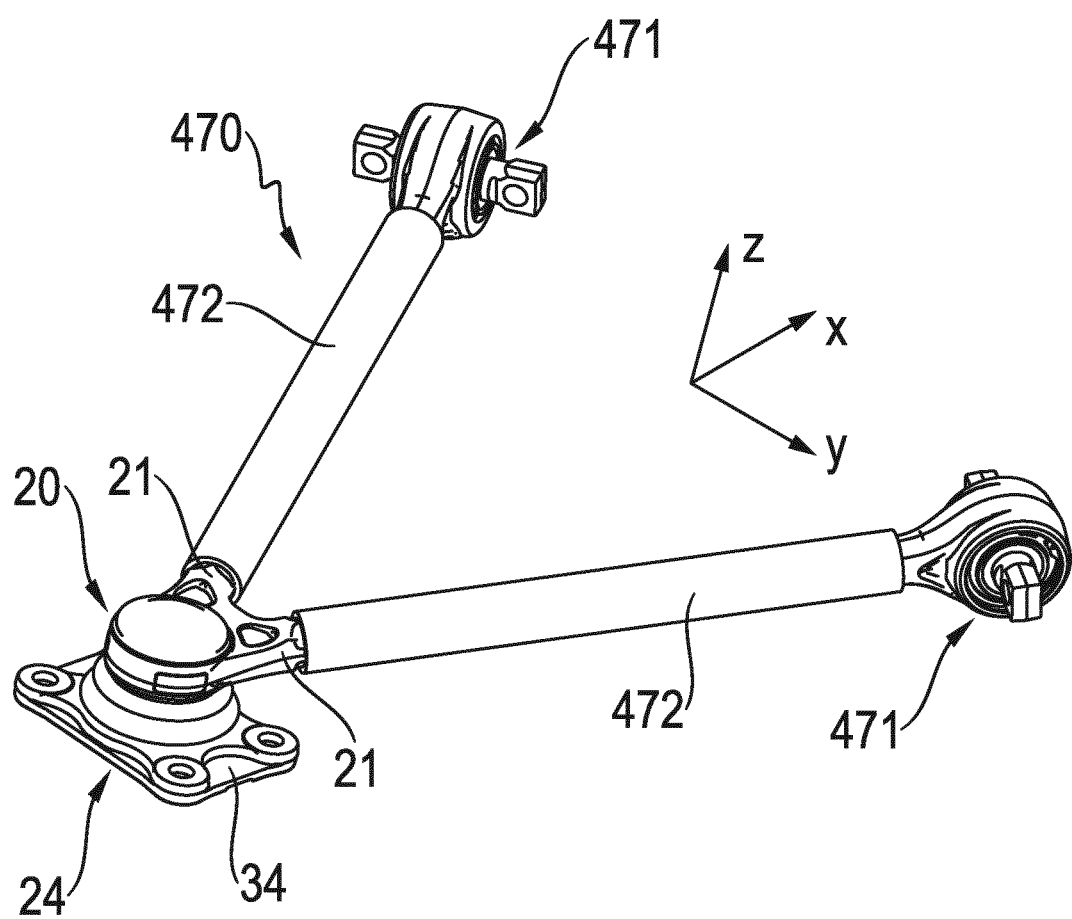
FIG. 11 is a perspective oblique top view of a three-point suspension link according to the invention.

A V-shaped three-point suspension link 470 shown in FIG. 11 has two tubular link arms 472 which are arranged so as to form an angle with one another and converge in a central joint 20. The link arms 472 are rigidly connected to one of the two shafts 21 of the central joint 20 in each instance. Each of the two link arms 472 is rigidly connected at the free end thereof to a guide joint which is formed in each instance as a molecular joint 471. The three-point suspension link 470 is connectable to a vehicle frame via the molecular joints 471 and to a rigid axle via the flange plate 34 of the axle connection 24. Accordingly, the three-point suspension link 470 is formed as an axle guide link for guiding a rigid axle.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A three-point suspension link formed as an axle guide link for guiding a rigid axle of a vehicle, comprising:
   a central joint having a housing supported by a ball joint so as to be rotatably and swivelably movable relative to an axle connection of said central joint and a captive securing arrangement constructed to function as a stop, and detachably or undetachably connected to said axle connection, said captive securing arrangement extending perpendicular to a central axis of said axle connection operatively in two spatial directions and is formed to be rotationally symmetric, and preventing a separation of said housing and said axle connection in the event of a failure of said ball joint;
   said housing having a housing opening toward said axle connection, wherein said housing opening is formed to be ellipse-shaped and has a larger extension in a longitudinal direction (x) of the vehicle than in a transverse direction (y) of the vehicle, wherein the longitudinal sides of said ellipse-shaped housing opening oriented in the longitudinal direction (x) of the vehicle are at a distance from one another that is less than an extension of said rotationally symmetrically formed captive securing arrangement perpendicular to said central axis of said axle connection.

2. The three-point suspension link according to claim 1, wherein said captive securing arrangement is formed symmetric with respect to a single plane extending through said central axis of said axle connection.

3. The three-point suspension link according to claim 1, wherein said captive securing arrangement is formed symmetric with respect to a plurality of planes extending through said central axis of said axle connection.

4. The three-point suspension link according to claim 1, wherein said captive securing arrangement is formed in a planar manner.

5. The three-point suspension link according to claim 1, wherein a surface of said captive securing arrangement is arranged at least substantially in a plane extending perpendicular to said central axis of said axle connection so as to function as a stop surface when there is a risk of separation of said central joint due to a failure of said ball joint.

6. The three-point suspension link according to claim 1, wherein said captive securing arrangement is detachably connected to said axle connection.

7. The three-point suspension link according to claim 6, wherein said one connection element is formed in one piece with said captive securing arrangement or with said axle connection.

8. The three-point suspension link according to claim 7, wherein said captive securing arrangement and said axle connection are connected to one another by a radial press connection.

9. The three-point suspension link according to claim 1, wherein said rotationally symmetric captive securing arrangement is plate-shaped or disk-shaped.

10. The three-point suspension link according to claim 1, wherein said housing has at least one internal clearance into which an outer area of said captive securing arrangement can project during a large deflection of said central joint.

11. The three-point suspension link according to claim 1, wherein a flange plate of said axle connection has at least one clearance into which an outer area of said housing can project during a large deflection of said central joint.

12. The three-point suspension link according to claim 1, additionally comprising a dome or a journal of said axle connection having at least one clearance into which an outer area of said housing and/or an outer area of a bearing shell of said ball joint can project.

13. The three-point suspension link according to claim 1, wherein said ball joint has an inner part, and an outer part abuttingly surrounding said inner part; and wherein said inner part is formed as an annular, separate component part and having a convex lateral surface formed as a spherical zone.

14. The three-point suspension link according to claim 1, additionally comprising two link arms forming an angle with one another and converging at a first end of said three-point suspension link in a first bearing point; wherein said three-point suspension link is connectable in the first bearing point to a rigid axle body of a rigid axle via said central joint; and wherein two other ends of said three-point suspension link are connectable to a vehicle frame via a guide joint.

* * * * *